United States Patent Office 3,371,110
Patented Feb. 27, 1968

3,371,110
CATALYTIC CONVERSION OF AROMATIC CARBOXYLIC ACIDS TO PHENOLS
Lyle A. Hamilton, Pitman, and Phillip S. Landis, Woodbury, N.J., assignors to Mobil Oil Corporation, a corporation of New York
No Drawing. Filed Jan. 29, 1964, Ser. No. 341,120
17 Claims. (Cl. 260—476)

This invention relates to the catalytic conversion of aromatic carboxylic acids to phenols and, more particularly, to such conversions involving the use of the novel catalytic materials.

As a result of the need for plentiful sources of phenolic compounds, processes for the production of phenols utilizing aromatic carboxylic acids as starting materials have been developed. One such process involves the oxidation of aromatic carboxylic acids to form the corresponding esters of such acids and the subsequent conversion of such esters to the corresponding phenols through a hydrolysis reaction, a by-product of the hydrolysis reaction being the starting aromatic carboxylic acid. This process may be broadly represented by the following equations (wherein Ar represents an aryl radical):

(1) $2ArCOOH + 1/2O_2 \longrightarrow ArCOOAr + H_2O + CO_2$
(2) $ArCOOAr + H_2O \longrightarrow ArCOOH + ArOH$ The above process is ordinarily carried out in the presence of a catalyst and, for practical purposes, prior art investigators have restricted such catalyst to copper or to a copper-containing material.

In accordance with the present invention, it has now been found that extremely advantageous results may be obtained in the conversion of aromatic carboxylic acids to phenols using solid, porous crystalline aluminosilicates or isomorphs thereof. As will become apparent from the ensuing description, while particularly advantageous results are obtained with the use of copper-containing crystalline aluminosilicate catalysts, the present invention is not so restricted.

It is accordingly a primary object of the present invention to provide a novel process for the conversion of aromatic carboxylic acids to phenols using solid, porous crystalline aluminosilicates or isomorphs thereof.

It is another important object of the present invention to provide a novel process for the conversion of aromatic carboxylic acids to phenols involving the use of metal cation-containing crystalline aluminosilicates or isomorphs thereof, preferred metal cations being copper, nickel and uranium.

It is a further important object of the present invention to provide a novel method for synthesizing phenolic compounds comprising oxidizing an aromatic carboxylic acid to an ester thereof and subsequently hydrolyzing said ester to produce a phenolic compound and the initial aromatic carboxylic acid, at least the oxidation reaction taking place under oxidation reaction conditions in the presence of a solid, porous crystalline aluminosilicate or an isomorph thereof.

These and further important objects and advantages of the present invention will become more apparent in connection with the following discussion and appended claims.

Zeolitic materials, both natural and synthetic, in naturally occurring and modified forms, have been demonstrated in the past to have catalytic capabilities for various types of hydrocarbon conversion. Such zeolitic materials are ordered crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of large dimensions, these materials have come to be known as "molecular sieves" and are utilized in a variety of ways to take advantage of these properties.

The present invention, as aforesaid, involves the use of such zeolitic materials (or isomorphs thereof) for the purpose of catalytically converting aromatic carboxylic acids to phenols. More specifically, the present invention comprises the oxidation of an aromatic carboxylic acid to a corresponding ester of the carboxylic acid and the subsequent hydrolysis of such ester to the desired phenolic compound and the starting aromatic carboxylic acid, at least the oxidation reaction and preferably both the oxidation and the hydrolysis reactions taking place under reaction conditions in the presence of a solid, porous crystalline aluminosilicate catalyst or an isomorph thereof.

The starting materials of the present invention may include any aromatic carboxylic acid. Such acid may contain either an aryl or a naphthyl nucleus (as exemplified, for example, by benzoic acid, salicylic acid, tertiary butyl benzoic acids, toluic acids and naphthoic acids). Aromatic monocarboxylic acids containing biphenyl, bibenzyl or stilbene nuclei can also be converted to phenolic compounds in accordance with the process of the present invention.

Those acids found most useful in the carrying out of the process of the present invention are monocarboxylic acids of the benzene series having at least one open position on the benzene ring adjacent to the point of attachment of the carboxyl group and in which any non-carboxyl substituents are stable groups, such as phenyl, alkyl, alkoxy, nitro, halogen, etc. Merely by way of example of carboxylic acids which may be converted to phenols, it is within the contemplation of the present invention to convert benzoic acid to phenol; o-toluic acid to m-cresol; m-toluic acid to o- and p-cresol; p-toluic acid to m-cresol; m-nitrobenzoic acid to p-nitrophenol; p-nitrobenzoic acid to m-nitrophenol; p-chlorobenzoic acid to m-chlorophenol; p-methoxybenzoic acid to m-methoxyphenol; p-phenylbenzoic acid to m-phenylphenol; 2,4-dimethylbenzoic acid to 3,5-dimethylphenol; etc.

Preferably, the starting aromatic carboxylic acid is utilized in liquid phase. Such acid may be liquefied either by melting it or by dissolving it in an inert medium such as water, benzene, toluene, xylene, biphenyl, phenyl benzoate, hexachlorobutadiene, etc. Of the various organic media which may be used for dissolving the acid, the preferred solvents are biphenyl for operations at or near atmospheric pressure and toluene or benzene for operations at elevated pressures.

The aluminosilicates useable as catalysts in accordance with the present invention include a wide variety of positive ion-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metl cation. This equilibrium cn be expressed by formula wherein the ratio of $Al_2$ to the number of the various cations, such as Ca, Sr, $Na_2$, $K_2$ or $Li_2$, is equal to unity. One cation may be exchanged either in entirety or partially by another cation utilizing ion exchange techniques as discussed hereinbelow. By means of such cation exchange, it is sometimes possible, or even desirable, to vary the size of the pores in the given aluminosilicate by suitable selection of the particular cation. The spaces between the tetrahedra are occupied by molecules of water prior to dehydration.

A description of zeolites of the type useable in the present invention is found in Patent 2,971,824, whose disclosure is hereby incorporated herein by reference. These aluminosilicates have well-defined intra-crystalline dimensions such that only reactant or product molecules of suitable size and shape may be transported in either direction between the exterior phase and the interior of the crystalline zeolite.

In their hydrated form, the aluminosilicates may be represented by the formula:

$$M_{2/n}O:Al_2O_3:wSiO_2:yH_2O \qquad (I)$$

wherein M is a cation which balances the electrovalence of the tetrahedra, $n$ represents the valence of the cation, $w$ the moles of $SiO_2$, and $y$ the moles of $H_2O$, the removal of which produces the characteristic open network system. The cation may be any one or more of a number of positive ions as aforesaid, such ions being discussed in greater detail hereinafter. The parent zeolite is dehydrated to actuate it for use as a catalyst. Although the proportions of inorganic oxides in the silicates and their spatial arrangement may vary, effecting distinct properties in the aluminosilicates, the main characteristic of these materials is their ability to undergo dehydration without substantially affecting the $SiO_4$ and $AlO_4$ framework. In this respect, this characteristic is essential for obtaining catalyst compositions of high activity in accordance with the invention.

Representative materials include a synthetic faujasite, designated Zeolite X, which can be represented in terms of mole ratios of oxides as follows:

$$1.0 \pm 0.2 M_{2/n}O:Al_2O_3:2.5 \pm 0.5 SiO_2:yH_2O \qquad (II)$$

wherein M is a metal cation having a valence of not more than three, $n$ represents the valence of M, and $y$ is a value up to eight depending on the identity of M and degree of hydration of the crystal. The sodium form may be represented in terms of mole ratios of oxides as follows:

$$0.9Na_2O:Al_2O_3:2.5SiO_2:6.1H_2O \qquad (III)$$

Another synthesized crystalline aluminosilicate, designated Zeolite A, can be represented in mole ratios of oxides as:

$$1.0 \pm 0.2 M_{2/n}O:Al_2O_3:1.85 \pm 0.5 SiO_2:yH_2O \qquad (IV)$$

wherein M represents a metal cation, $n$ is the valence of M, and $y$ is any value up to about 6. As usually prepared, Zeolite A contains primarily sodium cations and is designated sodium Zeolite A.

Other suitable synthesized crystalline aluminosilicates are those designated Zeolite Y, L and D.

The formula for Zeolite Y (which is a synthetic faujasite) expressed in oxide mole ratios is:

$$0.9 \pm 0.2 Na_2O:Al_2O_3:wSiO_2:yH_2O \qquad (V)$$

wherein $w$ is a value ranging from 3 to 6 and $y$ may be any value up to about 9.

The composition of Zeolite L in oxide mole ratios may be represented as:

$$1.0 \pm 0.1 M_{2/n}O:Al_2O_3:6.4 \pm 0.5 SiO_2:yH_2O \qquad (VI)$$

wherein M designates a metal cation, $n$ represents the valence of M, and $y$ is any value from 0 to 7.

The formula for Zeolite D, in terms of oxide mole ratios, may be represented as:

$$0.9 \pm 0.2[xNa_2O:(1-x)K_2O]:Al_2O_3:wSiO_2:yH_2O \qquad (VII)$$

wherein $x$ is a value of 0 to 1, $w$ is from 4.5 to about 4.9 and $y$, in the fully hydrated form, is about 7.

Other synthetic crystalline aluminosilicates which can be used include those designated as Zeolite R, S, T, Z, E, F, Q and B.

The formula for Zeolite R in terms of oxide mole ratios may be written as follows:

$$0.9 \pm 0.2 Na_2O:Al_2O_3:wSiO_2:yH_2O \qquad (VIII)$$

wherein $w$ is from 2.45 to 3.65, and $y$, in the hydrated form, is about 7.

The formula for Zeolite S in terms of oxide mole ratios may be written as:

$$0.9 \pm 0.2 Na_2O:Al_2O_3:wSiO_2:yH_2O \qquad (IX)$$

wherein $w$ is from 4.6 to 5.9 and $y$, in the hydrated form, is about 6 to 7.

The formula for Zeolite T in terms of oxide mole ratios may be written as:

$$1.1 \pm 0.4 xNa_2O:(1-x)K_2O:Al_2O_3:6.9 \pm 0.5 SiO_2:yH_2O \qquad (X)$$

wherein $x$ is any value from about 0.1 to about 0.8 and $y$ is any value from about 0 to about 8.

The formula for Zeolite Z in terms of oxide mole ratios may be written as:

$$K_2O:Al_2O_3:2SiO_2:yH_2O \qquad (XI)$$

wherein $y$ is any value not exceeding 3.

The formula for Zeolite E in terms of oxide mole ratios may be written as:

$$0.9 \pm 0.1 M_{2/n}O:Al_2O_3:1.95 \pm 0.1 SiO_2:yH_2O \qquad (XII)$$

wherein M is a metal cation, $n$ is the valence of the cation, and $y$ is a value of 0 to 4.

The formula for Zeolite F in terms of oxide mole ratios may be written as:

$$0.95 \pm 0.15 M_{2/n}O:Al_2O_3:2.05 \pm 0.3 SiO_2:yH_2O \qquad (XIII)$$

wherein M is a metal cation, $n$ is the valence of the cation, and $y$ is any value from 0 to about 3.

The formula for Zeolite Q, expressed in terms of oxide mole ratios, may be written as:

$$0.95 \pm 0.05 M_{2/n}O:Al_2O_3:2.2 \pm 0.05 SiO_2:yH_2O \qquad (XIV)$$

wherein M is a metal cation, $n$ is the valence of the cation, and $y$ is any value from 0 to 5.

The formula for Zeolite B may be written in terms of oxide mole ratios as:

$$1.0 \pm 0.2 M_{2/n}O:Al_2O_3:3.5 \pm 1.5 SiO_2:yH_2O \qquad (XV)$$

wherein M represents a metal cation, $n$ is the valence of the cation, and $y$ has an average value of 5.1 but may range from 0 to 6.

Other synthesized crystalline aluminosilicates include those designated as ZK–4 and ZK–5.

ZK–4 can be represented in terms of mole ratios of oxides as:

$$0.1 \text{ to } 0.3R:0.7 \text{ to } 1.0M_{2/n}O:Al_2O_3:2.5 \text{ to } 4.0SiO_2:yH_2O \qquad (XVI)$$

wherein R is a member selected from the group consisting of methylammonium oxide, hydrogen oxide and mixtures thereof with one another, M is a metal cation, $n$ is the valence of the cation, and $y$ is any value from about 3.5 to about 5.5. As usually synthesized, Zeolite ZK–4 contains primarily sodium cations and can be represented by unit cell formula:

$$7.5 \pm 2Na:2 \pm 0.5H:9 \pm 2AlO_2:15 \pm 2SiO_2 \qquad (XVII)$$

The major lines of the X-ray diffraction pattern of ZK–4 are set forth in Table 1 below:

TABLE 1

| $d$ value of reflection in A°: | 100 $I/I_0$ |
|---|---|
| 12.00 | 100 |
| 9.12 | 29 |
| 8.578 | 73 |
| 7.035 | 52 |
| 6.358 | 15 |
| 5.426 | 23 |

TABLE 1—Continued

| d value of reflection in A°: | 100 I/I₀ |
|---|---|
| 4.262 | 11 |
| 4.062 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.90 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

ZK–4 can be prepared by preparing an aqueous solution of oxides containing $Na_2O$, $Al_2O_3$, $SiO_2$, $H_2O$ and tetramethyl-ammonium ion having a composition, in terms of oxide mole ratios, which falls within the following ranges:

$SiO_2/Al_2O_3$  2.5 to 11

$\dfrac{Na_2O}{Na_2O+[(CH_3)_4N]_2O}$  0.5 to 2.5

$\dfrac{Na_2O+[(CH_3)_4N]_2O}{SiO_2}$  1 to 2

$\dfrac{H_2O}{Na_2O+[(CH_3)_4N]_2O}$  25 to 50 maintaining the mixture at a temperature of about 100° C. to 120° C. until the crystals are formed, and separating the crystals from the mother liquor. The crystal material is thereafter washed until the wash effluent has a pH essentially that of wash water and subsequently dried.

ZK–5 is representative of another crystalline aluminosilicate which is prepared in the same manner as Zeolite ZK–4 except that N,N'-dimethyltriethylenediammonium hydroxide is used in place of tetramethylammonium hydroxide. ZK–5 may be prepared from an aqueous sodium aluminosilicate mixture having the following composition expressed in terms of oxide mole ratios as:

$SiO_2/Al_2O_3$  2.5 to 11

$\dfrac{Na_2O}{Na_2O+[(CH_2)_6N_2(CH_3)_2]OH}$  0.5 to 2.5

$\dfrac{H_2O}{Na_2O+[(CH_2)_6N_2(CH_3)_2]OH}$  25 to 50

$\dfrac{Na_2O+[(CH_2)_6N_2(CH_3)_2]OH}{SiO_2}$  1 to 2

The N,N'-dimethyltriethylenediammonium hydroxide used in preparing ZK–5 can be prepared by methylating 1,4-diazabicyclo-(2.2.2)-octane with methyl iodide or dimethyl sulfate, followed by conversion to the hydroxide by treatment with silver oxide or barium hydroxide. The reaction may be illustrated as follows:

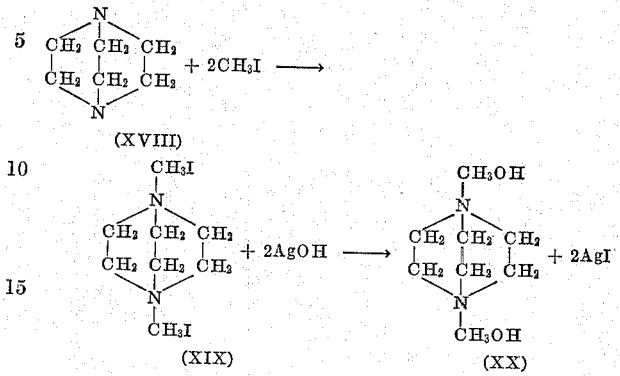

In using the N,N'-dimethyltriethylenediammonium hydroxide compound in the preparation of ZK–5, the hydroxide may be employed per se, or further treated with a source of silica, such as silica gel, and thereafter reacted with aqueous sodium aluminate in a reaction mixture whose chemical composition corresponds to the above-noted oxide mole ratios. Upon heating at temperatures of about 200 to 600° C., the methyl ammonium ion is converted to hydrogen ion.

Quite obviously, the above-listed molecular sieves are only representative of the synthetic crystalline aluminosilicate molecular sieve catalysts which may be used in accordance with the process of the present invention, the particular enumeration of such sieves not being intended to be exclusive.

At the present time, two commercially available molecular sieves are those of the "A" series and of the "X" series. A synthetic zeolite known as "Molecular Sieve 4A" is a crystalline sodium aluminosilicate having an effective pore diameter of about 4 angstroms. In the hydrated form, this material is chemically characterized by the formula:

$$Na_{12}(AlO_2)_{12}(SiO_2)_{12} \cdot 27H_2O$$

The synthetic zeolite known as "Molecular Sieve 5A" is a crystalline aluminosilicate salt having an effective pore diameter of about 5 angstronms and in which substantially all of the 12 ions of sodium in the immediately above formula are replaced by calcium, it being understood that calcium replaces sodium in the ratio of one calcium ion for two sodium ions. A crystalline sodium aluminosilicate is also available commercially under the name of "Molecular Sieve 13X." The letter "X" is used to distinguish the inter-atomic structure of this zeolite from that of the "A" crystal mentioned above. As initially prepared and before activation by dehydration, the 13X material contains water and has the unit cell formula $$Na_{86}[(AlO_2)_{86}(SiO_2)_{106}] \cdot 267H_2O$$

The synthetic zeolite known as "Molecular Sieve 10X" is a crystalline aluminosilicate salt in which a substantial proportion of the sodium ions of the 13X material have been replaced by calcium.

Among the naturally occurring crystalline aluminosilicates which can be employed for purposes of the invention, the preferred aluminosilicates are those which sorb at least 2 wt. percent normal butane at 1 atm. and 25° C., i.e., those having a pore diameter greater than about 5.4 A. Examples of such aluminosilicates include faujasite, dachiardite and mordenite. With the latter aluminosilicates, it is essential that they be in proper ionic form, else the pore diameter becomes smaller than 5.4 A.

Other aluminosilicates which can be used are those resulting from caustic treatment of various clays.

Of the clay materials, montmorillonite and kaoline families are representative types which include the sub-bentonites, such as bentonite, and the kaolins commonly identified as Dixie, McNamee, Georgia and Florida clays in which the main mineral constituents is halloysite, kaolinite, dickite, nacrite or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

$Na_2O$/clay (dry basis)    1.0–6.6 to 1
$SiO_2$/clay (dry basis)    0.01–3.7 to 1
$H_2O/Na_2O$ (mole ratio)    35–180 to 1

Molecular sieves are ordinarily prepared initially in the sodium form of the crystal. The sodium ions in such form may, as desired, be exchanged for other cations, as will be described in greater detail below. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water washed until the water in equilibrium with the zeolite has a pH in the range of 9 to 12. After activating by heating until dehydration is attained, the substance is ready for use.

For example, in the preparation of sodium zeolite "A," suitable reagents for the source of silica include silica sol, silica gel, silicic acid or sodium silicate. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the following ranges: $SiO_2/Al_2O_3$ of 0.5 to 2.5, $Na_2O/SiO_2$ of 0.8 to 3.0 and $H_2O/Na_2O$ of 35 to 200. A convenient and generally employed process of preparation involves preparing an aqueous solution of sodium aluminate and sodium hydroxide and then adding with stirring an aqueous solution of sodium silicate.

The reaction mixture is placed in a suitable vessel which is closed to the atmosphere in order to avoid losses of water and the reagents are then heated for an appropriate length of time. Adequate time must be used to allow for recrystallization of the first amorphous precipitate that forms. While satisfactory crystallization may be obtained at temperatures from 21° to 150° C., the pressure being atmospheric or less, corresponding to the equilibrium of the vapor pressure with the mixture at the reaction temperature, crystallization is ordinarily carried out at about 100° C. As soon as the zeolite crystals are completely formed they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with salt-free water, which on the filter, until the wash water, in equilibrium with the zeolite, reaches a pH of 9 to 12. The crystals are then dried at a temperature between 25° C. and 150° C. Activation is attained upon dehydration, as for example at 350° C. and 1 mm. pressure or at 350° C. in a stream of dry air.

It is to be noted that the material first formed on mixing the reactants is an amorphous precipitate which is, generally speaking, not catalytically active in the process of the invention. It is only after transformation of the amorphous precipitate to crystalline form that the highly active catalyst described herein is obtained.

Molecular sieves of the other series may be prepared in a similar manner, the composition of the reaction mixture being varied to obtain the desired ratios of ingredients for the particular sieve in question.

The molecular sieve catalysts useable in the process of the present invention may be in the sodium form as aforesaid or may contain other cations including other metallic cations and/or hydrogen. In preparing the non-sodium forms of the catalyst composition, the aluminosilicate can be contacted with a non-aqueous or aqueous fluid medium comprising a gas, polar solvent or water solution containing the desired positive ion. Where the aluminosilicate is to contain metal cations, the metal cations may be introduced by means of a salt soluble in the fluid medium. When the aluminosilicate is to contain hydrogen ions, such hydrogen ions may be introduced by means of a hydrogen ion-containing fluid medium or a fluid medium containing ammonium ions capable of conversion to hydrogen ions.

In those cases in which the aluminosilicate is to contain both metal cations and hydrogen ions, the aluminosilicate may be treated with a fluid medium containing both the metal salt and hydrogen ions or ammonium ions capable of conversion to hydrogen ions. Alternatively, the aluminosilicate can be first contacted with a fluid medium containing a hydrogen ion or ammonium ion capable of conversion to a hydrogen ion and then with a fluid medium containing at least one metallic salt. Similarly, the aluminosilicate can be first contacted with a fluid medium containing at least one metallic salt and then with a fluid medium containing a hydrogen ion or an ion capable of conversion to a hydrogen ion or a mixture of both.

Water is the preferred medium for reasons of economy and ease of preparation in large scale operations involving continuous or batchwise treatment. Similarly, for this reason, organic solvents are less preferred but can be employed providing the solvent permits ionization of the acid, ammonium compound and metallic salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like.

The hydrogen ion, metal cation or ammonium ion may be present in the fluid medium in an amount varying within wide limits dependent upon the pH value of the fluid medium. Where the aluminosilicate material has a molar ratio of silica to alumina greater than about 5.0, the fluid medium may contain a hydrogen ion, metal cation, ammonium ion, or a mixture thereof, equivalent to a pH value ranging from less than 1.0 up to a pH value of about 10.0. Within these limits, pH values for fluid media containing a metallic cation and/or an ammonium ion range from 4.0 to 10.0, and are preferably between a pH value of 4.5 to 8.5. For fluid media containing a hydrogen ion alone or with a metallic cation, the pH values range from less than 1.0 up to about 7.0 and are preferably within the range of less than 3.0 up to 6.0. Where the molar ratio of aluminosilicate is greater than about 3.0 and less than about 5.0, the pH value for the fluid media containing a hydrogen ion or a metal cation ranges from 3.8 to 8.5. Where ammonium ions are employed, either alone or in combination with metallic cations, the pH value ranges from 4.5 to 9.5 and is preferably within the limit of 4.5 to 8.5. When the aluminosilicate material has a molar ratio of silica to alumina less than about 3.0, the preferred medium is a fluid medium containing an ammonium ion instead of a hydrogen ion. Thus, depending upon the silica to alumina ratio, the pH value varies within rather wide limits.

In carrying out the treatment with the fluid medium, the procedure employed comprises contacting the aluminosilicate with the desired fluid medium or media until such time as metallic cations originally present in the aluminosilicate are removed to the desired extent. Repeated use of fresh solutions of the entering ion is of value to secure more complete exchange. Effective treatment with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 5 and 8. The aluminosilicate material is thereafter analyzed for metallic ion content by methods well known in the art. Analysis also involves analyzing the effluent wash for anions obtained in the wash as a result of the treatment, as well as determination of and correction for anions that pass into the effluent wash from soluble substances or decomposition products of insoluble substances which are otherwise present in the aluminosilicate as impurities. The aluminosilicate is then dried and dehydrated.

The actual procedure employed for carrying out the fluid treatment of the aluminosilicate may be accomplished in a batchwise or continuous method under atmospheric, subatmospheric or superatmospheric pressure. A solution of the ions of positive valence in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogeneous pressure. Similarly, treatments involving fusion or vapor phase contact may be employed providing the melting point or vaporization temperature of the acid or ammonium compound is below the decomposition temperature of the aluminosilicate.

A wide variety of acidic compounds can be employed with facility as a source of hydrogen ions and include both inorganic and organic acids.

Representative inorganic acids which can be employed include acids such as hydrochloric acid, hypochlorous acid, chloroplatinic acid, sulfuric acid, sulfurous acid, hydrosulfuric acid, peroxydisulfuric acid $(H_2S_2O_8)$, peroxymonosulfuric acid $(H_2SO_5)$, dithionic acid $(H_2S_2O_6)$, sulfamic acid $(H_2NHS_3H)$, amidodisulfonic acid $$(NH(SO_3H)_2)$$

chlorosulfuric acid, thiocyanic acid, hyposulfurous acid $(H_2S_2O_4)$, pyrosulfuric acid $(H_2S_2O_7)$, thiosulfuric acid $(H_2S_2O_3)$, nitrosulfonic acid $(HSO_3.NO)$, hydroxylamine disulfonic acid $[(HSO_3)_2NOH]$, nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid,
acetic acid,
chloroacetic acid,
dichloroacetic acid,
trichloroacetic acid,
bromoacetic acid,
propionic acid,
2-bromopropionic acid,
3-bromopropionic acid,
lactic acid,
n-butyric acid,
isobutyric acid,
crotonic acid,
n-valeric acid,
isovaleric acid,
n-caproic acid,
oenanthic acid,
pelargonic acid,
capric acid,
undecyclic acid,
lauric acid,
myristic acid,
palmitic acid,
stearic acid,
oxalic acid,
malonic acid,
succinic acid,
glutaric acid,
adipic acid,
pimelic acid,
suberic acid,
azelaic acid,
sebacic acid,
alkylsuccinic acid,
alkenylsuccinic acid,
maleic acid,
fumaric acid,
itaconic acid,
citraconic acid,
mesaconic acid,
glutonic acid,
muconic acid,
ethylidene malonic acid,
isopropylidene malonic acid,
allyl malonic acid.

Representative aromatic and cycloaliphatic monocarboxylic dicarboxylic and polycarboxylic acids include 1,2-cyclohexanedicarboxylic acid,
1,4-cyclohexanedicarboxylic acid,
2-carboxy-2-methylcyclohexaneacetic acid,
phthalic acid,
isophthalic acid,
terephthalic acid,
1,8-naphthalenedicarboxylic acid,
1,2-naphthalenedicarboxylic acid,
tetrahydrophthalic acid,
3-carboxy-cinnamic acid,
hydrocinnamic acid,
pyrogallic acid,
benzoic acid,
ortho,
meta and para-methyl,
hydroxy,
chloro,
bromo and nitro-substituted benzoic acids,
phenylacetic acid,
mandelic acid,
benzylic acid,
hippuric acid,
benzenesulfonic acid,
toluenesulfonic acid,
methanesulfonic acid
and the like.

Other sources of hydrogen ions include carboxy polyesters prepared by the reaction of an excess of polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising crosslinked resinous polymers of monovinyl aromatic monomers and polyvinyl compounds. These resins are well known materials which are generally presented by copolymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are sulfonated to provide the hydrogen form of the resin.

Still another class of compounds which can be employed are ammonium compounds which decompose to provide hydrogen ions when an aluminosilicate treated with a solution of said ammonium compound is subjected to temperatures below the decomposition temperature of the aluminosilicate.

Representative ammonium compounds which can be employed include

| | |
|---|---|
| ammonium hydroxide, | ammonium chloroplumbate, |
| ammonium chloride, | |
| ammonium bromide, | ammonium citrate, |
| ammonium iodide, | ammonium dithionate, |
| ammonium carbonate, | ammonium fluoride, |
| ammonium bicarbonate, | ammonium gallate, |
| ammonium sulfate, | ammonium nitrate, |
| ammonium sulfide, | ammonium nitrite, |
| ammonium thiocyanate, | ammonium formate, |
| ammonium dithiocarbamate, | ammonium propionate, |
| ammonium peroxysulfate, | ammonium butyrate, |
| ammonium acetate, | ammonium valerate, |
| ammonium tungstate, | ammonium lactate, |
| ammonium molybdate, | ammonium malonate, |
| ammonium benzoate, | ammonium oxalate, |
| ammonium borate, | ammonium palmitate, |
| ammonium carbamate, | ammonium tartrate |
| ammonium sesquicarbonate, | and the like. |

Still other ammonium compounds which can be employed include complex ammonium compounds such as tetramethylammonium hydroxide, trimethylammonium chloride. Other compounds which can be employed are nitrogen bases such as the salts of guanidine, pyridine, quinoline, etc.

A wide variety of metallic compounds can be employed with facility as a source of metallic cations and include both inorganic and organic salts of the metals of Groups I through VIII of the Periodic Table.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates and the like. The only limitation on the particular metal salt or salts employed is that it be soluble in the fluid medium in which it is used. The preferred salts are the chlorides, nitrates, acetates and sulfates.

Rare earth salts may be advantageously employed. Such salts can either be the salt of a single metal or, preferably, of mixtures of metals such as a rare earth chloride or didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. The rare earth chloride solution is commercially available and it contains the chlorides of a rare earth mixture having the relative composition: cerium (as $CeO_2$) 48% by weight; lanthanum (as $La_2O_3$) 24% by weight; praseodymium (as $Pr_6O_{11}$) 5% by weight; neodymium (as $Nd_2O_3$) 17% by weight; samarium (as $Sm_2O_3$) 3% by weight; gadolinium (as $Gd_2O_3$) 2% by weight; yttrium (as $Y_2O_3$) 0.2% by weight; and other rare earth oxides 0.8% by weight. Dydmium chloride is also a mixture of rare earth chlorides, but having a low cerium content. It consists of the following rare earths determined as oxides: lanthanum, 45–46% by weight; cerium, 1–2% by weight; praseodymium, 9–10% by weight, neodymium, 32–33% by weight; samarium, 5–6% by weight; gadolinium, 3–4% by weight; yttrium, 0.4% by weight; other rare earths, 1–2% by weight. It is to understood that other mixtures of rare earths are equally applicable in the instant invention.

Representative metal salts which can be employed, aside from the mixture mentioned above, include silver nitrate,
silver acetate,
silver arsenate,
silver citrate,
silver oxide,
silver tartrate,
calcium acetate,
calcium arsenate,
calcium benzoate,
calcium bromide,
calcium carbonate,
calcium chloride,
calcium citrate,
beryllium bromide,
beryllium carbonate,
beryllium hydroxide,
beryllium sulfate,
barium acetate,
barium bromide,
barium carbonate,
barium citrate,
barium malonate,
barium nitrite,
barium oxide,
barium sulfide,
magnesium chloride,
magnesium bromide,
magnesium sulfate,
magnesium sulfide,
magnesium acedate,
magnesium formate,
magnesium stearate,
magnesium tartrate,
manganese chloride,
manganese sulfate,
magnesium acetate,
manganese carbonate,
manganese carbonate,
manganese formate,
zinc sulfate,
zinc nitrate,
zinc acetate,
zinc chloride,
zinc bromide,
aluminum chloride,
aluminum bromide,
aluminum acetate,
aluminum citrate,
aluminum nitrate,
aluminum oxide,
aluminum phosphate,
aluminum sulfate,
titanium bromide,
titanium chloride,
titanium nitrate,
titanium sulfate,
zirconium chloride,
zirconium nitrate,
zirconium sulfate,
cupric sulfate,
cupric phosphate,
cupric benzoate,
cupric salicylate,
cupric acetate,
uranyl acetate,
uranyl chloride,
uranyl nitrate,
chromic acetate,
chromic chloride,
chromic nitrate,
chromic sulfate,
ferric chloride,
ferric bromide,
ferric acetate,
ferrous chloride,
ferrous arsenate,
ferrous lactate,
ferrous sulfate,
nickel chloride,
nickel bromide,
cerous acetate,
cerous bromide,
cerous carbonate,
cerous chloride,
cerous iodide,
cerous sulfate,
cerous sulfide,
lanthanum chloride,
lanthanum bromide,
lanthanum nitrate,
lanthanum sulfate,
lanthanum sulfide,
yttrium bromate,
yttrium bromide,
yttrium chloride,
yttrium nitrate,
yttrium sulfate,
samarium acetate,
samarium chloride,
samarium bromide,
samarium sulfate,
neodymium chloride,
neodymium oxide,
neodymium sulfide,
neodymium sulfate,
praseodymium chloride,
praseodymium bromide,
praseodymium sulfate,
praseodymium sulfide,
selenium chloride,
selenium bromide,
tellurium chloride,
tellurium bromide, etc.

The aluminosilicate catalysts useable in connection with the process of the present invention may be used in powdered, granular or molded state formed into spheres or pellets of finely divided particles having a particle size of 2 to 500 mesh. In cases where the catalyst is molded, such as by extrusion, the aluminosilicate may be extruded before drying, or dried or partially dried and then extruded. The catalyst product is then preferably precalcined in an inert atmosphere near the temperature contemplated for conversion but may be calcined initially during use in the conversion process. Generally, the aluminosilicate is dried between 150° F. and 600° F. and thereafter calcined in air or an inert atmosphere of nitrogen, hydrogen, helium, flue gas or other inert gas at temperatures ranging from about 500° F. to 1500° F. for periods of time ranging from 1 to 48 hours or more.

The aluminosilicate catalysts prepared in the foregoing manner may be used as catalysts per se or as intermediates in the preparation of further modified contact masses consisting of inert and/or catalytically active materials which otherwise serve as a base, support, carrier, binder, matrix or promoter for the aluminosilicate. One embodiment of the invention is the use of the finely divided aluminosilicate catalyst particles in a siliceous gel matrix wherein the catalyst is present in such proportions that the resulting product contains about 2 to 95% by weight, preferably about 5 to 75% by weight, of the aluminosilicate in the final composite.

The aluminosilicate-siliceous gel compositions can be prepared by several methods wherein the aluminosilicate is combined with silica while the latter is in a hydrous state such as in the form of a hydrosol, hydrogel, wet gelatinous precipitate or a mixture thereof. Thus, silica gel formed by hydrolyzing a basic solution of alkali metal silicate with an acid such as hydrochloric, sulfuric, etc., can be mixed directly with finely divided aluminosilicate having a particle size less than 40 microns, preferably within the range of 2 to 7 microns. The mixing of the two components can be accomplished in any desired manner, such as in a ball mill or other types of kneading mills. Similarly, the aluminosilicate may be dispersed in a hydrosol obtained by reacting an alkali metal silicate with an acid or an alkaline coagulant. The hydrosol is then permitted to set in mass to a hydrogel which is thereafter dried and broken into pieces of desired shape, or dispersed through a nozzle into a bath of oil or other water-immiscible suspending medium to obtain spheroidally shaped "bead" particles of catalyst. The aluminosilicate siliceous gel thus obtained is washed free of soluble salts and thereafter dried and/or calcined as desired.

The siliceous gel matrix may also consist of a plural gel comprising a predominant amount of silica with one or more metals or oxides thereof. The preparation of plural gels is well known and generally involves either separate precipitation or coprecipitation techniques in which a suitable salt of the metal oxide is added to an alkali metal silicate and an acid or base, as required, is added to precipitate the corresponding oxides. The silica content of the siliceous gel matrix contemplated herein is generally with the range of 55 to 100 weight percent with the metal oxide content ranging from zero to 45 percent. Minor amounts of promoters or other materials which may be present in the composition include cerium, chromium, cobalt, tungsten, uranium, platinum, lead, zinc, calcium, magnesium, lithium, silver, nickel and their compounds.

The aluminosilicate catalyst may also be incorporated in an alumina gel matrix conveniently prepared by adding ammonium hydroxide, ammonium carbonate, etc. to a salt of aluminum, such as aluminum chloride, aluminum sulfate, aluminum nitrate, etc., in an amount to form aluminum hydroxide, which, upon drying, is converted to alumina. The aluminosilicate catalyst can be mixed with the dried alumina or combined while the alumina is in the form of a hydrosol, hydrogel or wet gelatinous precipitate.

In general, the preferred crystalline aluminosilicates for use in the process of the present invention are those containing copper. Also particularly advantageous in carrying out the process of the present invention are the crystalline aluminosilicates containing nickel and/or uranyl cations. If desired, a mixture of such catalysts (i.e., a mixture of copper 13X and nickel 13X molecular sieves) may be employed.

For maximum effectiveness in carrying out the process of the present invention, the crystalline aluminosilicate used as a catalyst should have pores or channels of a size such that the reactants will pass into such pores or channels and the reaction products will be removable therefrom. Quite obviously, the particular pore size which is desirable will vary depending upon the particular starting materials utilized and the products to be formed as a result of the reaction. In general, it can be stated that the most desirable molecular sieves for use in the instant process are those having a pore size of approximately 7–15 A.

The process of the present invention may be carried out either on a batch basis or in a continuous manner. Batch treatment of the charge stock may be effected in reactors or autoclaves of suitable design in which the charge and catalyst are exposed to the desired conditions of operation for a time sufficient to effect the desired results. Under such conditions of operation, the crystalline aluminosilicate catalyst should be present in a quantity of approximately 5–20% by weight of the mixture of catalyst and charge stock.

The process of the present invention is preferably carried out on a continuous basis in a reactor containing a fixed bed or layer of the crystalline aluminosilicate catalyst through which the charge stock is passed under the desired conditions of temperature and pressure. Under such conditions of operation, the reaction products are discharged continuously from the reactor at substantially the same rate as that under which the charge stock is fed into the reactor. If desired, of course, a continuous process utilizing a fluidized bed may be employed in a conventional manner. When a continuous process is employed, liquid hourly space velocities of about 0.25–2.0 volumes of reactant fluid/vol. catalyst/hr. and gaseous space velocities of about 100–1000 volumes of reactant gas/vol. catalyst/hr. may be advantageously employed.

The reaction condtions employed in the process of the present invention will necessarily vary depending upon the starting material employed. The temperatures employed in the process of the present invention are approximately 400–700° F. with temperatures of 400–600° F. being preferred. While atmospheric pressure is preferred for most desirable results, elevated pressures may also be used.

To produce phenolic compounds in accordance with the process of the present invention, it is necessary to supply an oxidizing medium to the reaction zone in contact with the starting aromatic carboxylic acid. Such oxidizing medium may be provided in the form of any otherwise inert gas containing elemental oxygen including, for example, ozone, gaseous oxygen or air, the use of air being most convenient and economical. Where a liquid phase acid is utilized, the reaction will accordingly take place between a liquid and a gas phase.

As previously indicated, an intermediate product obtained from the process of the present invention is the ester of the starting aromatic carboxylic acid. As an example, with benzoic acid as a starting material, phenyl benzoate is an intermediate reaction product. This intermediate ester is, in accordance with the process of the present invention, converted to the desired phenol through hydrolysis, which may be effected conveniently by the introduction of water into the reaction system. For most desirable results, such water may be introduced in the form of steam. Since one of the by-products of the hydrolysis reaction will be the starting aromatic carboxylic acid, a sufficient stoichiometric excess of water should be utilized in the hydrolysis reaction to convert the intermediate ester to the desired phenol and aromatic carboxylic acid to the maximum extent so that the carboxylic acid can be reutilized as starting material for maximum efficiency. Similarly, it is desirable to use a slight excess of oxygen in the oxidation reaction over that theoretically needed to convert the acid to its corresipnding ester.

In carrying out the process of the present invention on a continuous basis, the phenolic compound produced will be removed from the reactor as a vapor along with volatile by-products and unconsumed starting materials. These vapors may be separated from one another and the phenolic product isolated therefrom by conventional techniques. Merely by way of example, the phenolic compound may be absorbed by conventional solvent extraction techniques or may be selectively condensed in a distillation column if there is a significant difference between the boiling point of the acid and that of the phenol.

When the reactor is operated so that the reaction products are in vapor form, a complex high boiling mixture may accumulate in the reaction zone, which accumulation may gradually reduce the reactor efficiency. Such efficiency may be maintained at a high level through the periodic withdrawal of such complex high boiling mixture, separating the undesirable portion of it and returning the usable portion to the reaction for further reaction.

The following example will illustrate the practice of the present invention:

One hundred twenty grams of benzoic acid and fifteen grams of a copper exchanged 13X molecule sieve are charged into a stirred cylindrical reaction vessel. Agitation is provided by a mechanical stirrer. Air and steam, each at 500 ml./minute, are passed through the heated reactants heated at 250° C. The gases and volatile reaction products are passed through a reflux condenser for returning liquid products and reactants to the reactor. After three hours the products are analyzed and, in addition to unreacted benzoic acid, contained about 30 grams of phenol. Minor amounts of benzene and tarry by-products are also observed.

In addition to the foregoing, various materials serve to promote the carrying out of the process of the present application. For example, materials such as the salts of magnesium, sodium, potassium, cobalt, lithium and barium help to prevent by-product tar formation when they are present during the carrying out of the oxidation of the carboxylic acids to their corresponding phenols. Such promoter materials may be introduced into the reaction environment either through a mixture of crystalline aluminosilicates (i.e., a copper exchanged 13X molecular sieve mixed with a potassium exchanged 13X molecule sieve) or, preferably, by utilizing a single type of crystalline aluminosilicate containing both catalytic and promoter cations (i.e., a potassium molecular sieve in which part of the potassium has been replaced by copper ions).

In the foregoing portions of the specification, a novel process for the catalytic conversion of aromatic carboxylic acids to phenolic compounds using solid, porous crystalline aluminosilicate catalysts has been set forth. It is to be understood, however, that the practice of the present invention is also applicable to isomorphs of said crystalline aluminosilicates. For example, the aluminum may be replaced by elements such as gallium and silicon by elements such as germanium.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of oxidizing an aromatic monocarboxylic acid to an ester thereof, said acid having its carboxyl group attached directly to the aromatic ring, comprising bringing said acid into contact with an otherwise inert gas containing elemental oxygen in the presence of a solid, porous, positive ion-containing, crystalline aluminosilicate molecular sieve catalyst, the pores of said crystalline aluminosilicate being of a size such as to permit ingress therein of said monocarboxylic acid and egress therefrom of said ester.

2. A method as defined in claim 1 wherein said catalyst contains at least one metal cation.

3. A method as defined in claim 2 wherein said metal cation is selected from at least one of the group consisting of copper, nickel and uranium.

4. A method as defined in claim 2 wherein said metal cation is copper.

5. A method as defined in claim 1 wherein said aromatic monocarboxylic acid is in the liquid phase.

6. A method as defined in claim 1 wherein said catalyst contains at least two metal cations, one of said cations catalyzing the oxidation reaction and the other of said cations serving as a promoter to prevent side reactions.

7. A method as defined in claim 6 wherein said promoter and catalyzing cations are both carried by the same crystalline aluminosilicate.

8. A method as defined in claim 6 wherein each of said cations is exchanged on a separate crystalline aluminosilicate and the exchanged crystalline aluminosilicates mixed together.

9. A method as defined in claim 1 wherein said aromatic monocarboxylic acid is benzoic acid and said ester is phenyl benzoate.

10. A process for oxidizing a compound of the formula ArCOOH to form an ester of the formula ArCOOAr, wherein said Ar is an aromatic hydrocarbon radical and wherein said COOH group is attached directly to said aromatic hydrocarbon radical, comprising bringing said acid into contact with an otherwise inert gas containing elemental oxygen in the presence of a solid, porous, positive ion-containing crystalline aluminosilicate molecular sieve catalyst, the pores of said crystalline aluminosilicate being of a size such as to permit ingress therein of said ArCOOH and egress therefrom of said ArCOOAr.

11. A process as defined in claim 10 wherein said ArCOOH is in the liquid phase and wherein said catalyst contains at least one metal cation.

12. A process as defined in claim 11 wherein said metal cation is selected from at least one of the group consisting of copper, nickel and uranium.

13. A method of synthesizing phenolic compounds comprising placing an aromatic monocarboxylic acid in the presence of a solid, porous, positive ion-containing crystalline aluminosilicate molecular sieve catalyst; subjecting said acid while in the presence of said catalyst to an oxidation reaction by bringing said acid into contact with an otherwise inert gas containing elemental oxygen to convert said acid to an ester thereof; and subjecting said ester while in the presence of said catalyst to a hydrolysis reaction to convert said ester to form the desired phenolic compound, the pores of said crystalline aluminosilicate being of a size such as to permit ingress therein of the reactants in said oxidation and hydrolysis reactions and egress therefrom of the reaction products resulting from said reactions.

14. A method as defined in claim 13 wherein said acid is in the liquid phase.

15. A method as defined in claim 14 wherein said catalyst contains a metal selected from at least one of the group consisting of copper, nickel and uranium.

16. A method as defined in claim 13 wherein said catalyst contains pores of approximately 7–15 A. in diameter.

17. A method as defined in claim 13 wherein said oxidation and hydrolysis reactions are carried out at a temperature of about 400–700° F.

References Cited

UNITED STATES PATENTS 2,727,926  12/1955  Kaeding et al. _____ 260—621
2,762,838   9/1956  Toland _____ 260—621

BERNARD HELFIN, *Acting Primary Examiner.*

LEON ZITVER, *Examiner.*

D. M. HELFER, H. ROBERTS, *Assistant Examiners.*